3,361,801
KETONE DERIVATIVES
Basil S. Farah, West Seneca, N.Y., and Everett E. Gilbert, Morris Township, Morris County, and Pasquale Lombardo, East Hanover Township, Morris County, N.J., assignors to Allied Chemical Corporation, New York, N.Y., a corporation of New York
No Drawing. Filed Mar. 31, 1965, Ser. No. 444,425
15 Claims. (Cl. 260—515)

This invention relates to new bis aromatic derivatives of the ketone, decachlorooctahydro-1,3,4-metheno-2H-cyclobuta [cd] pentalen-2-one, and to a process for the preparation of the bis aromatic derivatives.

Decachlorooctahydro-1,3,4-metheno-2H-cyclobuta [cd] pentalen-2-one, hereinafter referred to as the ketone, is a complex chlorinated polycyclic ketone having the molecular formula $C_{10}Cl_{10}O$ and a molecular weight of 490.68. It is believed to be most accurately represented by the following cage structural formula:

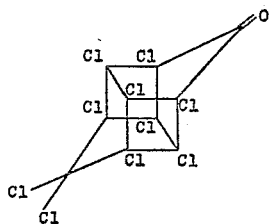

This ketone may be prepared in known manner by hydrolyzing the reaction product of hexachlorocyclopentadiene and sulfur trioxide.

An object of the invention is to provide new bis aromatic derivatives of the ketone, $C_{10}Cl_{10}O$.

Another object of the invention is to provide a simple and economical process for preparing bis aromatic derivatives of the ketone, $C_{10}Cl_{10}O$.

Other objects and advantages of the invention will be apparent from the following description.

The new derivatives of the present invention possess the formula:

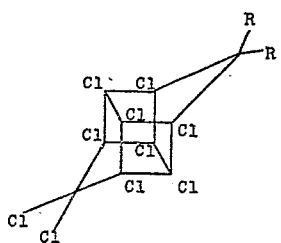

wherein each R is a like member of the group consisting of aryl, alkyl-substituted aryl, halo-substituted aryl, acetamido-substituted aryl, $NH_2$-substituted aryl, COOH-substituted aryl and COOR'-substituted aryl radicals in which R' is an alkyl radical.

The alkyl-substituted aryl radicals generally contain alkyl substituents having 1 to 15 carbon atoms, preferably 1 to 4 carbon atoms. The halogen in the halo-substituted aryl radicals is preferably chlorine. The R' in COOR' is preferably an alkyl radical containing 1 to 4 carbon atoms.

The bis-aromatic derivatives of the type described above, wherein each R is a like member of the group consisting of aryl, alkyl-substituted aryl, halo-substituted aryl and acetamido-substituted aryl radicals may be prepared by reacting the ketone with an aromatic compound having the formula RH wherein R is a member of the group consisting of aryl, alkyl-substituted aryl, halo-substituted aryl and acetamido-substituted aryl radicals in the presence of aluminum chloride, the mol ratio of aluminum chloride to the ketone being at least about 0.75 to 1.

Illustrative of suitable aromatic reactants are benzene, toluene, ortho-xylene, 1,2,4-trimethyl benzene, "detergent alkylate" (long chain monoalkylated benzenes such as dodecylbenzene), monochlorobenzene, acetanilide, diphenyl, diphenyl ether, diphenyl sulfide, diphenyl methane, alkylated diphenyl such as p-methyldiphenyl, halogenated diphenyl such as p-chlorodiphenyl, naphthalene, alkylated naphthalene such as α-methylnaphthalene, halogenated naphthalene such as α-chloronaphthalene, etc.

Generally speaking, the aluminum chloride is employed in anhydrous form, in mol ratio of about 0.75 to 4.0, and preferably about 1.5 to 2.5, mols per mol of the ketone. If catalytic amounts of aluminum chloride are employed, the desired products are not obtained.

The mol ratio of the reactants may vary widely; however, it is preferred to employ at least about 2 mols of aromatic compound per mol of the ketone. Representative mol ratios range from about 2 to 30 mols of aromatic compound per mol of the ketone.

When the aromatic compound is a liquid, use of a solvent is optional since the aromatic compound itself functions as a solvent. In such case, the mol ratio of aromatic compound to the ketone is about 15–30 to 1. When, however, the aromatic compound is a solid, a solvent must be employed. Suitable solvents are inert to the reactants and the desired product and include carbon disulfide, aliphatic hydrocarbons such as heptane, hexane, etc., nitromethane, chlorinated aliphatic hydrocarbons such as methylene chloride, tetrachloro ethylene, etc.

Reaction temperatures may range from about room temperature to 200° C. and are preferably about 40° to 80° C. The reaction is generally carried out at these temperatures for a period of about ½ to 50 hours or more, preferably for about 1 to 8 hours.

If the ketone is in hydrate form, it is dehydrated before reaction by heating it in an oven at temperatures of about 135° to 150° C. or by refluxing it with an aromatic solvent such as xylene to remove the water.

Recovery of the desired bis-aromatic derivative may be effected by any appropriate procedure. For example, following reaction, the reaction mixture can be hydrolyzed to remove aluminum chloride and then distilled to remove solvent, if present. The resulting crude bis-aromatic derivative may be purified by recrystallization from a suitable solvent.

Bis-aminoaryl derivatives may be obtained by hydrolyzing bis-acetamidoaryl derivatives of the ketone. For example, a bis-aminophenyl derivative may be obtained by hydrolysis of the bis-acetamidophenyl derivative. Bis-carboxyaryl derivatives may be obtained by oxidizing bis-methylaryl derivatives of the ketone. For example, a bis-carboxyphenyl derivative may be obtained by oxidation of the bis-methylphenyl derivative. Bis-carboxyaryl ester derivatives may be obtained by esterifying the bis-carboxyaryl derivatives of the ketone. For example, a bis-carbomethoxyphenyl derivative may be obtained by esterifying the carboxyphenyl derivative with methanol. In the preparation of these compounds, conventional hydrolysis, oxidation and esterification processes are employed.

All of the bis-aromatic derivatives of this invention can be sulfonated to form compounds having surface active properties. The bis-aminophenyl derivatives are intermediates for preparing heat-stable polyamides, azo and other dyes and polyurethanes via their disocyanates. The bis-carboxyphenyl compounds and their esters may be employed as intermediates for the preparation of heat-stable polyamides and polyesters.

The following examples, in which parts are by weight, are typical of preparation of the bis-aromatic derivatives of this invention. The anhydrous ketone employed in the examples was obtained by refluxing a hydrated form of the ketone with an aromatic solvent to remove the water.

*Example 1.—(Bis-phenyl derivative)*

To a reaction vessel, equipped with a mechanical stirrer and drying tube to prevent the introduction of moisture, was charged a solution of about 47 parts of the anhydrous ketone in about 39 parts of benzene. To this solution was added 25 parts of anhydrous aluminum chloride. The reaction was exothermic, the temperature rising to 40° C. The reaction mixture was stirred overnight at room temperature and then mixed with dilute aqueous HCl to hydrolyze the aluminum chloride. Methylene chloride was added to aid layer separation. The organic layer was dried over anhydrous magnesium sulfate and sodium carbonate and the solvent removed in vacuo. A solid was obtained which was triturated with boiling ether, filtered and washed with ether. This gave 38 parts of a solid having a melting point of 272–278° C. Treatment of the solid with decolorizing carbon in boiling benzene gave a white product having a melting point of 279–282° C. Elemental anlysis for the product,

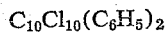
$C_{10}Cl_{10}(C_6H_5)_2$ gave the following results.

Calculated: carbon, 42.0%; hydrogen, 1.6%; chlorine, 56.4%. Found: carbon, 41.7%; hydrogen, 1.8%; chlorine, 56.1%.

*Example 2.—(Bis-methylphenyl derivative)*

The procedure of Example 1 was followed, except that 85 parts of the anhydrous ketone, about 476 parts of toluene and 50 parts of anhydrous aluminum chloride were employed. Due to the exothermic reaction, the temperature rose to 63° C. Work-up of the reaction mixture, as in Example 1 (except that ether was used for recrystallization) gave 65 parts of white solid melting at 228–230° C. Elemental analysis for the product, $C_{10}Cl_{10}(C_6H_4CH_3)_2$ gave the following results.

Calculated: carbon, 43.9%; hydrogen, 2.1%; chlorine, 54.1%. Found: carbon, 44.5%; hydrogen, 2.1%; chlorine, 53.9%.

*Example 3.—(Bis-chlorophenyl derivative)*

The procedure of Example 1 was followed, except that about 49 parts of the anhydrous ketone, about 111 parts of chlorobenzene and 25 parts of anhydrous aluminum chloride were employed. Work-up of the reaction mixture, as in Example 1, gave a white solid melting at 285–286.5° C. Elemental analysis of the product, $C_{10}Cl_{10}(C_6H_4Cl)_2$, gave the following results.

Calculated: carbon, 37.8%; hydrogen, 1.2%; chlorine, 61.1%. Found: carbon, 38.0%; hydrogen, 1.4%; chlorine, 60.4%.

*Example 4.—(Bis-ortho-dimethylphenyl derivative)*

The procedure of Example 1 was followed, except that 215 parts of the anhydrous ketone, about 705 parts of ortho-xylene and 117 parts of anhydrous aluminum chloride were used. Work-up of the reaction mixture, as in Example 1, gave a white solid melting at 262–264° C. Elemental analysis for the product,

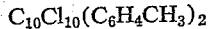
$C_{10}Cl_{10}[(C_6H_3)(CH_3)_2]_2$ gave the following results.

Calculated: carbon, 45.6%; hydrogen, 2.6%; chlorine, 51.8%. Found: carbon, 45.7%; hydrogen, 2.6%; chlorine, 51.1%.

*Example 5.—(Bis-acetamidophenyl derivative)*

505 parts of the anhydrous ketone were added to the reactor of Example 1 containing a mixture of 454 parts of anhydrous aluminum chloride and 322 parts of acetanilide in about 1261 parts of carbon disulfide. The reaction temperature rose to 34° C. and then dropped below 30° C. over a two hour period. The reaction mixture was refluxed at 45–48° C. for 60 hours. After cooling, the top layer of carbon disulfide was decanted. The residue was then poured into ice water, filtered, washed with water (70° C.) and dried overnight. 735 parts of a white solid, $C_{10}Cl_{10}(C_6H_4NHCOCH_3)_2$, melting above 320° C. with decomposition were obtained.

*Example 6.—(Bis-aminophenyl derivative)*

37 parts of the bis-acetanilide derivative of Example 5, 500 parts of glacial acetic acid and 500 parts of concentrated HCl were mixed and refluxed overnight. Complete solution of the bis-acetanilide derivative occurred in 30 minutes. The resulting hydrochloride was filtered off, washed and dried. The hydrochloride was then converted to the free base by stirring for two hours with 10% aqueous NaOH and purified by recrystallization from 50% aqueous methanol. The product comprised white crystals of $C_{10}Cl_{10}(C_6H_4NH_2)_2$ melting above 310° C. with decomposition.

*Example 7.—(Bis-carboxyphenyl derivative)*

80 parts of the bis-methylphenyl derivative of Example 2, 1200 parts of glacial acetic acid and 150 parts of concentrated $H_2SO_4$ were mixed in a reactor equipped with a stirrer. 100 parts of chromic oxide were added at 25–30° C. with stirring and external cooling. The reaction was substantially complete in about an hour. The reaction mixture was stirred overnight, poured into water and 87 parts of solid product separated by filtration. The product was purified by recrystallization from a mixture of methanol and chloroform to yield a white solid melting above 360° C. with decomposition. Elemental analysis for the product, $C_{10}Cl_{10}(C_6H_4COOH)_2$, gave the following results:

Calculated: carbon, 40.4%; hydrogen, 1.4%; chlorine, 49.6%. Found: carbon, 40.8%; hydrogen, 1.9%; chlorine, 49.4%.

*Example 8.—(Bis-carbomethoxyphenyl derivative)*

One part of the bis-carboxyphenyl derivative of Example 7 was refluxed overnight with 10 parts of methanol and 0.2 part of concentrated $H_2SO_4$. The reaction mixture was poured into water, and 40 parts of solid were filtered off. After recrystallization from benzene-hexane, the product melted at 288–291° C. Chlorine analysis for the product, $C_{10}Cl_{10}(C_6H_4COOCH_3)_2$, was 47.5% (theory= 47.6%).

Infrared spectral curves on compounds prepared in the above examples were in agreement with the assigned chemical structures.

Since various changes and modifications may be made in this invention without departing from the spirit thereof, the invention is deemed to be limited only by the scope of the appended claims.

We claim:

1. A compound having the formula:

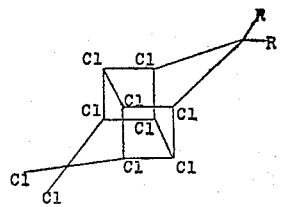

wherein each R is a like member of the group consisting of aryl, alkyl-substituted aryl, halo-substituted aryl, acetamido-substituted aryl, $NH_2$-substituted aryl, COOH-substituted aryl and COOR'-substituted aryl radicals in which R' is an alkyl radical.

2. A compound of claim 1 wherein each R is methylphenyl.

3. A compound of claim 1 wherein each R is ortho-dimethylphenyl.

4. A compound of claim 1 wherein each R is acetamidophenyl.

5. A compound of claim 1 wherein each R is aminophenyl.

6. A compound of claim 1 wherein each R is carboxyphenyl.

7. A process which comprises reacting decachlorooctahydro-1,3,4-methono-2H-cyclobuta [cd] pentalen-2-one with an aromatic compound having the formula RH wherein R is a member of the group consisting of aryl, alkyl-substituted aryl, halo-substituted aryl and acetamido-substituted aryl radicals in the presence of aluminum chloride, the mol ratio of aluminum chloride to the ketone being at least about 0.75 to 1.

8. The process of claim 7 wherein the mol ratio of aluminum chloride to decachlorooctahydro-1,3,4-metheno-2H-cyclobuta [cd] pentalen-2-one is about 0.75 to 4.0:1.

9. The process of claim 7 wherein the mol ratio of aluminum chloride to decachlorooctahydro-1,3,4-metheno-2H-cyclobuta [cd] pentalen-2-one is about 1.5 to 2.5:1.

10. The process of claim 7 wherein at least about 2 mols of aromatic compound per mol of decachlorooctahydro-1,3,4-metheno-2H-cyclobuta [cd] pentalen-2-one are employed.

11. The process of claim 7 wherein the aromatic compound is benzene.

12. The process of claim 7 wherein the aromatic compound is toluene.

13. The process of claim 7 wherein the aromatic compound is chlorobenzene.

14. The process of claim 7 wherein the aromatic compound is ortho-xylene.

15. The process of claim 7 wherein the aromatic compound is acetanilide.

References Cited

UNITED STATES PATENTS 2,332,867  10/1943  Niederl _____ 260—619
3,055,948   9/1962  Hoch et al. _____ 260—611

OTHER REFERENCES

Eaton et al.: J. Org. Chem. 25, (July, 1960) 1225–1227. QD241J6.

Olah, Friedel-Crafts and Related Reactions, II (1964), 597–600. QD501066.

LORRAINE A. WEINBERGER, *Primary Examiner.*

MARY WEBSTER, *Assistant Examiner.*